United States Patent [19]

Kasai

[11] Patent Number: 4,665,592
[45] Date of Patent: May 19, 1987

[54] SWIVEL SNAP HOOK OF SYNTHETIC RESIN

[75] Inventor: Kazumi Kasai, Namerikawa, Japan

[73] Assignee: Nippon Notion Kogyo Co., Ltd., Tokyo, Japan

[21] Appl. No.: 751,430

[22] Filed: Jul. 3, 1985

[30] Foreign Application Priority Data

Jul. 10, 1984 [JP] Japan ................ 59-142991
Jul. 13, 1984 [JP] Japan ............ 59-105998[U]

[51] Int. Cl.[4] ............................................. A44B 13/02
[52] U.S. Cl. ................................... 24/236; 24/237
[58] Field of Search ........... 24/236, 237, 231, 241 PL, 24/241 PS, 537, 489, 562, 536

[56] References Cited

U.S. PATENT DOCUMENTS

| | | | |
|---|---|---|---|
| 307,280 | 10/1884 | Farmer | 24/236 |
| 548,694 | 10/1895 | Breul | 24/237 |
| 750,373 | 1/1904 | Kinnear | 24/236 |
| 1,059,812 | 4/1913 | Barry | 24/236 |
| 1,744,344 | 1/1930 | Sullivan | 24/236 |
| 1,804,377 | 5/1931 | Freysinger | 24/236 |
| 2,033,766 | 3/1936 | Hall et al. | 24/236 |
| 2,217,052 | 10/1940 | Hall | 24/236 |
| 2,532,674 | 12/1950 | Nelsen | 24/536 |
| 3,825,012 | 7/1974 | Nicoll | 24/562 |
| 4,064,604 | 12/1977 | Hartman | 24/236 |
| 4,212,303 | 7/1980 | Nolan | 24/562 |

FOREIGN PATENT DOCUMENTS 380083 11/1907 France ................ 24/236
58-99515 7/1983 Japan .

Primary Examiner—Victor N. Sakran
Attorney, Agent, or Firm—Hill, Van Santen, Steadman & Simpson

[57] ABSTRACT

In a swivel snap hook of synthetic resin, a unitary hook member has a hook body and a resiliently deformable closure tongue molded integrally therewith, a free end of the closure tongue being, as the latter is in a free form, disposed inwardly of a free end of the hook body with a relatively small gap therebetween. In use, as the closure tongue is depressed inwardly against its resilience by a ring-shaped article to be threaded onto the hook body, the free end of the closure tongue is spaced wider from the free end of the hook body to open the latter. In production, the unitary hook member is molded on a specific mold in such a state or condition that the free end of the closure tongue is disposed inwardly of the free end of the hook body with the small gap therebetween.

12 Claims, 9 Drawing Figures

FIG. 7
FIG. 8
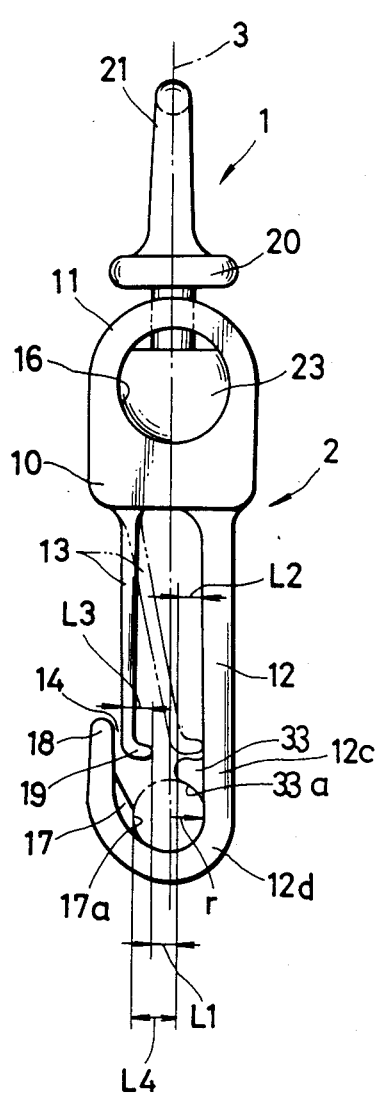
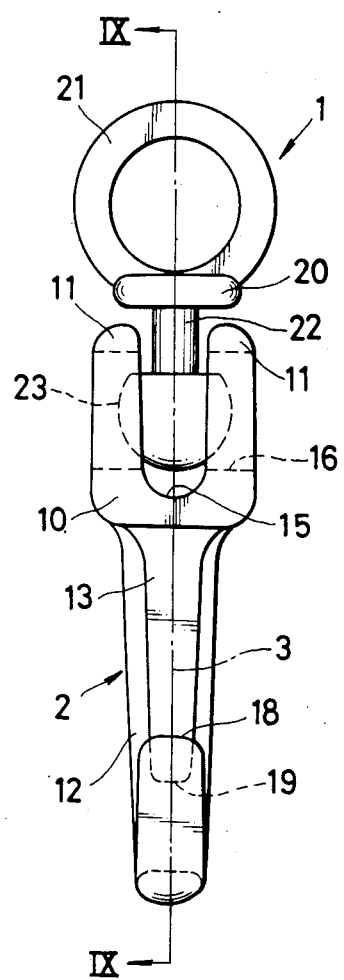

SWIVEL SNAP HOOK OF SYNTHETIC RESIN

BACKGROUND OF THE INVENTION

1. Field of the Invention:

The present invention relates to a swivel snap hook of synthetic resin for use on a carrying strap of a bag, for example. The invention also relates to a method of manufacturing such a swivel snap hook.

2. Prior Art:

There are now on the market various swivel snap hooks of synthetic resin, or metal, for use on a carrying strap of a bag such as a shoulder bag. The prior hooks have a hook body and a separate closure tongue which normally closes the hook body and which is resiliently deformable to open the hook body. However, the known hook is disadvantageous in that the hook body and the closure tongue need to be joined or assembled together after these two parts have been made independently of each other, causing only a limited rate of production and hence resulting in expensive products.

To this end, a solution has been proposed by Japanese Utility Model Laid-Open Publication (Kokai) No. 58-99511 in which the hook body and the closure tongue are formed of synthetic resin integrally with each other. In production, the hook body and the closure tongue are molded simultaneously on a common mold in such a manner that a free end of the closure tongue is initially disposed outwardly of a free end of the hook body with a relatively small gap therebetween. Then the closure tongue needs to be depressed inwardly of the hook body against the resilience of the closure tongue to bring its free end into engagement with the free end of the hook body on an inner side thereof, which is laborious and time-consuming. A common problem with the resultant hook is that since the free end of the closure tongue is outwardly urged against the free end of the hook body by a great amount of resilient force stored in the closure tongue, a greater amount of pushing force is required to bend the closure tongue inwardly when a ring-shaped article is to be threaded onto and removed from the hook body. Further, if the free end of the hook body is outwardly deformed by a heavy weight or if a great amount of pulling force is exerted on the hook body, the free end of the closure tongue would move out of engagement with the free end of the hook body and hence would restore its original shape (before assembling) under its own resilience.

SUMMARY OF THE INVENTION

In a swivel snap hook of synthetic resin according to the present invention, a unitary hook member has a hook body and a resiliently deformable closure tongue molded integrally therewith, a free end of the closure tongue being, as the latter is in a free form, disposed inwardly of a free end of the hook body with a relatively small gap therebetween. In use, as the closure tongue is depressed inwardly against its resilience by a ring-shaped article to be threaded onto the hook body, the free end of the closure tongue is spaced wider from the free end of the hook body to open the latter. In production, the unitary hook member is molded on a specific mold in such a state or condition that the free end of the closure tongue is disposed inwardly of the free end of the hook body with the small gap therebetween.

It is therefore an object of the present invention to provide a swivel snap hook of synthetic resin which can be produced in a reduced number of manufacturing steps, thus requiring no additional step of bringing a free end of the closure tongue inwardly of a free end of the hook body after the hook has been molded.

Another object of the invention is to provide a swivel snap hook of synthetic resin in which a closure tongue can be depressed easily with minimum pushing force.

Still another object of the invention is to provide a swivel snap hook of synthetic resin in which a closure tongue is free from being displaced outwardly of a free end of a hook body even when a heavy weight or a great amount of pulling force is exerted on the hook body.

A further object of the invention is to provide a method of and apparatus for manufacturing the above-mentioned swivel snap hook.

Many other advantages, features and additional objects of the present invention will become manifest to those versed in the art upon making reference to the detailed description and the accompanying drawings in which certain preferred embodiments incorporating the principles of the present invention are shown by way of illustrative example.

BRIEF DESCRIPTION OF THE DRAWINGS

FIG. 7 is a front elevational view of a modified swivel snap hook;

FIG. 8 is a side elevational view of FIG. 7; and

DETAILED DESCRIPTION

Figure 1:
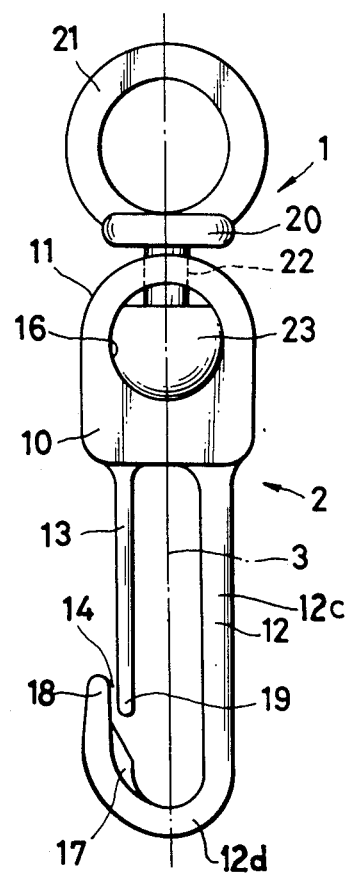
FIG. 1 is a front elevational view of a swivel snap hook of synthetic resin embodying the present invention.
Figure 2:
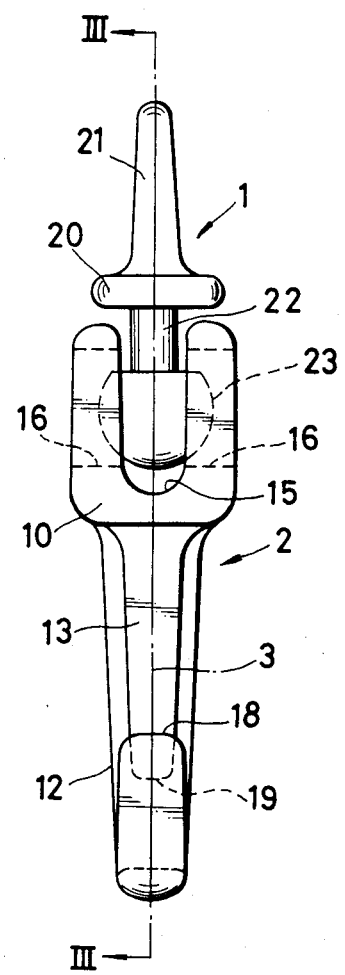
FIG. 2 is a side elevational view of FIG. 1.

FIGS. 1 through 4 show a swivel snap hook which comprises an eye member 1 adapted to be attached to one end of a carrying strap (not shown) of a bag such as a shoulder bag, and a hook member 2 rotatably and rockably connected to the eye member 1. The eye and hook members 1, 2 are molded of synthetic resin in a manner described below.

The hook member 2 has a first base 10, a hook body 12 extending downwardly from a lower side of the first base 10, and a planar closure tongue 13 extending downwardly from the lower side of the first base 10 so as to normally close the hook body 12 in a manner described below. The hook member 2 also has an integral bearing portion which extends upwardly from an upper side of the first base 10 and which is divided into a pair of opposed bearing halves 11, 11 by a space 15. The pair of opposed bearing halves 11, 11 have a pair of aligned through-holes 16, 16 of circular cross section communicating with the space 15.

The eye member 1 has a second base 20, a ring-shaped portion 21 extending upwardly from the second base 20, and an integral arm portion 22 extending downwardly from the second base 20 remotely from the ring-shaped portion 21 into the space 15 and terminating in an enlarged end 23 loosely received in the through-holes 16, 16 in the bearing halves 11, 11 across the space 15.

The arm portion 22 has a circular cross section of a diameter slightly smaller than the width of the space 15 (FIGS. 2 and 4), while the enlarged end 23 of the arm portion 22 is in the shape of a remainder of a sphere in which an upper segmental part has been cut off by a plane perpendicular to the axis 3 of the arm portion 22. The diameter of this sphere is larger than the width of the space 15 and is substantially equal to the diameter of the through-holes 16, 16. Thus the hook member 2 is rotatable and rockable on the eye member 1 and vice versa. Specifically, the hook member 2 is rotatable on the eye member 1 about the axis 3 of the arm portion 22 and is pivotally movable on the eye member 1 about the spherical enlarged end 23 in a plane which includes the axis 3 of the bearing portion and which is parallel to the bearing halves 11, 11.

The hook body 12 has a substantially straight stem portion 12c projecting perpendicularly from the base 10, and a hook-shaped portion 12b extending substantially perpendicularly from a lower end of the stem portion 12a and terminating in an upwardly directed free end 18. The hook-shaped portion 12d has on its inner curved surface adjacent to the free end 18 a reinforcing rib 17 which serves to prevent the hook-shaped portion 12b from being objectionably deformed due to undue stress exerted thereon.

Figure 3:
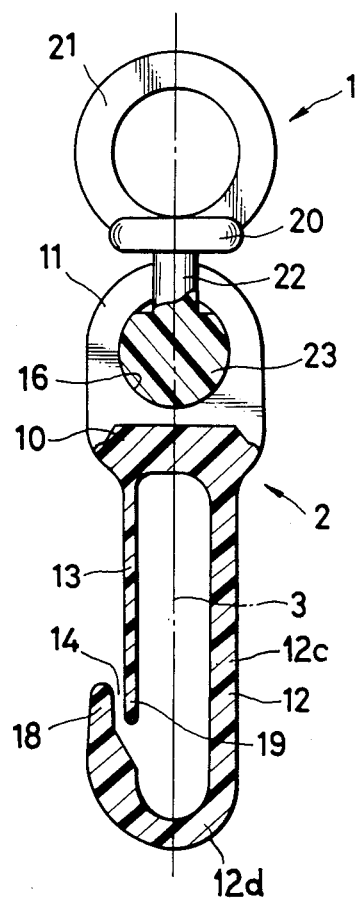
FIG. 3 is a cross-sectional view taken along line III—III of FIG. 2.
Figure 4:
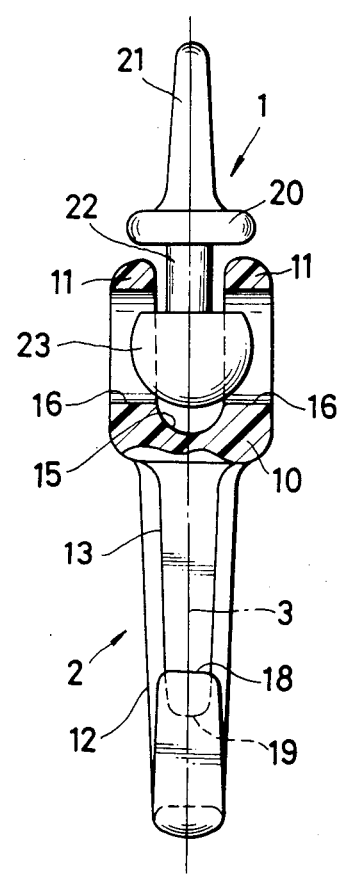
FIG. 4 is a side elevational view similar to FIG. 2, with parts broken away, illustrating a connection between an eye member and a hook member.

As shown in FIGS. 1 and 3, the closure tongue 13 extends downwardly from the base 10 in parallel relation to the stem portion 12c of the hook body 12 and terminates in a free, end 19 which, as the closure tongue 13 is in free form, is disposed inwardly of the free end 18 of the hook body 12 with a relatively small gap 14 therebetween. In use, as the closure tongue 13 is depressed inwardly against its resilience by a ring-shaped article (not shown) to be threaded onto the hook body 12, the free end 19 of the closure tongue 13 is spaced more widely from the free end 18 of the hook-shaped portion 12d to open the hook body 12 so that the article is allowed to be threaded onto the hook body 12. When the depressing force is released, the closure tongue 13 restores the shape of FIGS. 1 and 3 under its resilience to close the hook body 12, thus preventing the article from being removed from the hook body 12.

Figure 5:
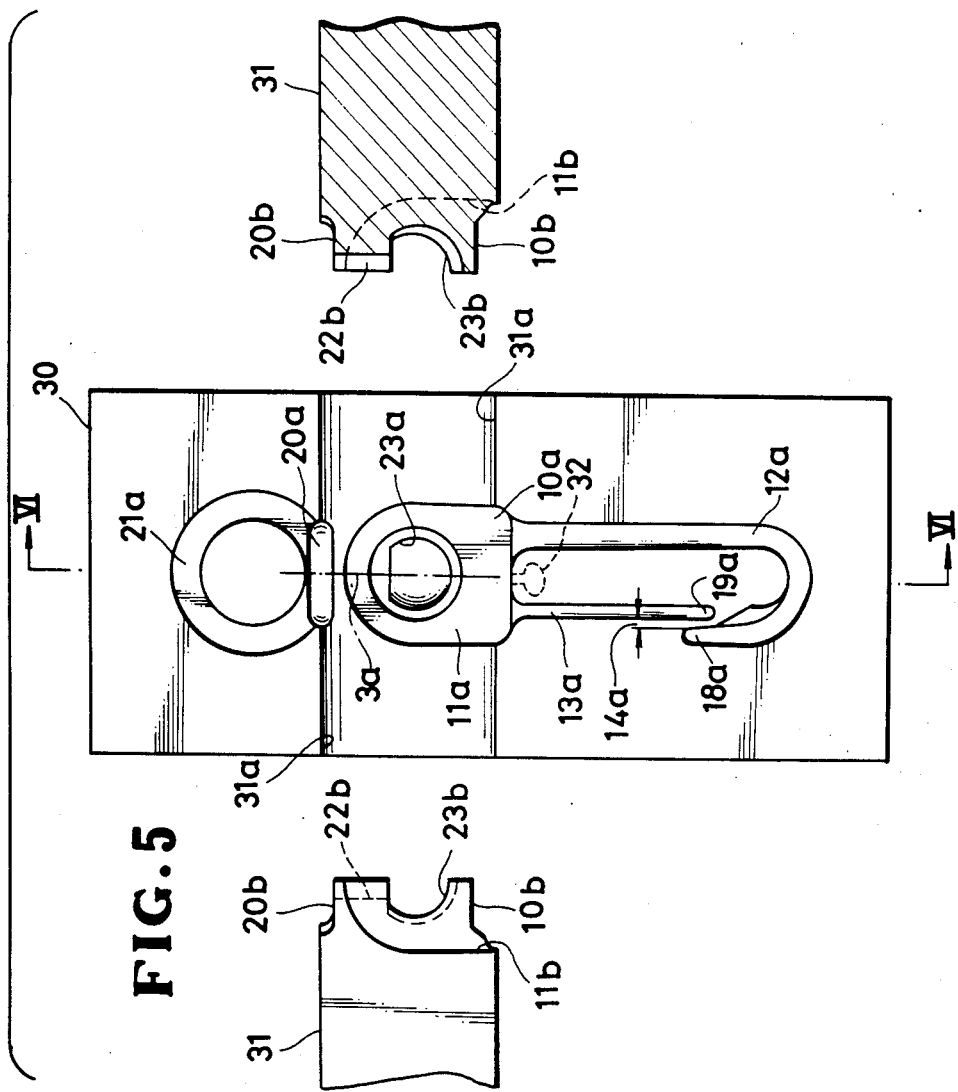
FIG. 5 is a fragmentary exploded view of a mold for molding the hook of FIGS. 1–4.
Figure 6:
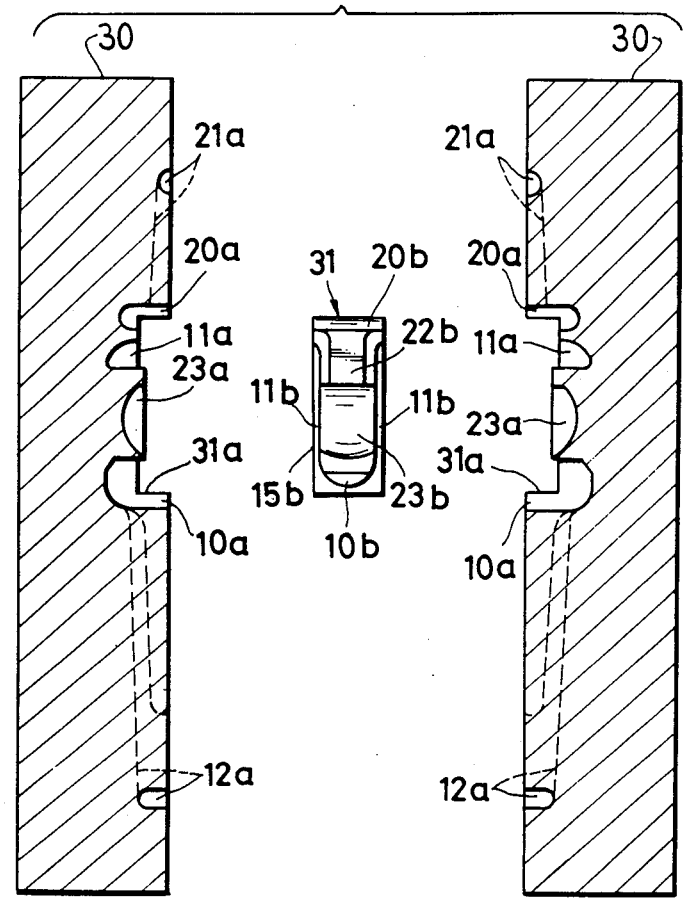
FIG. 6 is a cross-sectional view of the mold taken along line VI—VI of FIG. 5.

In production, the eye member 1 and the hook member 2 are molded on a mold simultaneously in a single molding step in coupled or assembled state. As shown in FIGS. 5 and 6, the mold includes a pair of molding die halves 30, 30, one being a mirror image of the other, and a pair of identical associated molding rods or slides 31, 31. The two molding die halves 30, 30 and the two associated molding rods 31, 31, when the mold is closed, jointly define a mold cavity having a contour corresponding to the shape of eye and hook members 1, 2 in coupled state.

The two molding die halves 30, 30 have a pair of symmetrical first recesses 21a, 21a for forming the ring-shaped portion 21 of the eye member 1 (of a prospective swivel snap hook), a pair of symmetrical second recesses 20a, 20a for forming a part of the second base 20 of the eye member 1, a pair of symmetrical third recesses 11a, 11a for forming a part of the bearing halves 11, 11, a pair of symmetrical fourth recesses 10a, 10a for forming a part of the first base 10 of the hook member 2, a pair of symmetrical fifth recesses 12a, 12a for forming a hook body 12, a pair of symmetrical sixth recesses 13a, 13a for forming the closure tongue 13, and a pair of symmetrical seventh recesses 23a, 23a for forming a part of the spherical enlarged end 23 of the arm portion 22. As shown in FIG. 5, in each molding half 30, the sixth recess 13a for the closure tongue 13 extends downwardly from the fourth recess 10a for the first base 10 and terminates in a free end 19a disposed adjacent to an upwardly directed free end 18a of the fifth recess 12a for the hook body 12 and spaced inwardly therefrom by a relatively small distance 14a corresponding to the gap 14 (FIGS. 1 and 3).

The pair of the associated molding rods or slides 31 have in their confronting ends a pair of symmetrical eighth recesses 20b, 20b for forming the remaining part of the first base 20 of the eye member 1, a pair of symmetrical ninth recesses 22b, 22b for forming the arm portion 22, a pair of symmetrical tenth recesses 23b, 23b for forming the remaining part of the spherical enlarged end 23 of the arm portion 22, a pair of symmetrical eleventh recess 10b, 10b for forming the remaining part of the second base 10 of the hook member 2, and two pairs of symmetrical twelfth recesses 11b, 11b; 11b, 11b for forming the remaining part of the bearing halves 11, 11 of the hook member 1.

Additionally, the two molding die halves 30, 30 have a pair of symmetrical thirteenth recesses 31a, 31a for jointly receiving the two associated molding rods 31, 31 during molding.

In molding, the mold is closed, namely, the two molding die halves 30, 30 are put together in such a manner that the first, second, third, fourth, fifth, sixth, seventh and thirteenth recesses 21a, 20a, 11a, 10a, 12a, 13a, 23a, 31a in one molding die half 30 are in registry with the corresponding recesses in the other molding die half 30. The associated molding rod 31 are inserted into the pair of symmetrical thirteenth recesses 31a, 31a halfway in such a manner that the two associated molding rods 31, 31 abut each other on their confronting ends at the center line 3a (FIG. 5) of the second, third, fourth and seventh recesses 20a, 11a, 10a, 23a. An amount of heat-softened thermoplastic synthetic resin is then injected through a sprue 32 (FIG. 5) into the closed mold to fill the mold cavity thereof. After the thermoplastic material filled in the mold cavity is cooled to become hard enough, the molded article (a prospective swivel snap hook) is removed from the mold by parting the molding die halves 30, 30 and the associated molding rods 31, 31, as is well known in the art.

As a result, the member 1 and the hook member 2 have been simultaneously molded in coupled or assembled state, at which time a free end 19 of the freshly molded closure tongue 13 is disposed inwardly of the free end 18 of the freshly molded hook body 12 with a relatively small gap 14 therebetween. Accordingly it is possible to obtain the final product, i.e. the swivel snap hook of FIGS. 1–4 in only a single molding step with no additional step of bringing the free end 19 of the closure tongue 13 inwardly of the free end 18 of the hook body 12 after the hook has been molded. The overall process for manufacturing this swivel snap hook is quite simplified and hence much less costly.

Figure 9:
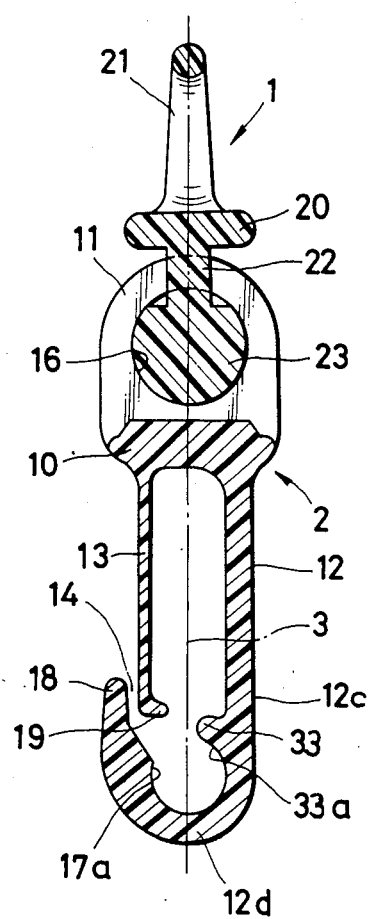
FIG. 9 is a cross-sectional view taken along line IX—IX of FIG. 8.

FIGS. 7 through 9 illustrate a modified swivel snap hook which is similar to the swivel snap hook of FIGS. 1–4, except that the free end 19 of the closure tongue 13 is bent inwardly, i.e. toward the stem portion 12c of the hook body 12 and that the hook body 12 has a projection 33 extending inwardly (toward the closure tongue 13) from the stem portion 12c. The projection 33 is disposed slightly below the bent end 19 of the closure tongue 13 so as not to interfere therewith when the closure tongue 13 is depressed to assume the phantom-line position of FIG. 7.

The projection 33 has a concave under-surface 33a as an extension of an arcuate inner surface of the hook-shaped portion 12d, and the reinforcement rib 17 also has a concave surface 17a as an extension of the arcuate inner surface of the hook-shaped portion 12d. These two concave surfaces 33a, 17a are a pair of diametrically opposed parts of the circumference of a circle having a radius r. The bent end 19 of the closure tongue 13, as the latter is in free form, is horizontally (in FIGS. 7 and 9) spaced apart from the projection 30 by a distance L1 substantially equal to the radius r. The projection 33 has a height L2 equal to the distance L3 between an outer surface of the closure tongue 13 and a tip of the bent end 19. The reinforcement rib 17 is in the shape of a generally equilateral triangle having an apex in which the concave surface 17a terminates; this apex is horizontally (FIGS. 7 and 9) spaced apart from a tip of the projection 33 by a distance L4 slightly larger than the radius r.

The inwardly bent end 19 of the closure tongue 13 and the projection 33 of the hook body 2 jointly serve to restrict upward movement of a ring-shaped article (not shown) threaded onto the hook-shaped portion 12d. Since the free end 19 of the closure tongue 13 is inwardly bent, the amount of deformation of the closure tongue 13 is reduced and limited so that the closure tongue 13 is prevented from being excessively depressed and hence broken, particularly at its foot portion about which the closure tongue 13 is angularly moved when the ring-shaped article is threaded onto and removed from the hook body 12.

Further, when the closure tongue 13 is fully depressed, its outer surface is flush with the tip of the projection 33 of the hook body 12, thus causing smooth threading and removal of the ring-shaped article. The concave under-surface 33a the projection 33 extends as an extension of the arcuate inner surface of the hook-shaped portion 12c and hence serves as a guide to assist in removing the ring-shaped article from the hook-shaped portion 12c.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A swivel snap hook of synthetic resin, comprising:
    (a) an eye member molded of synthetic resin;
    (b) a unitary hook member molded of synthetic resin having a base, a hook body extending from one side of said base, and a closure tongue extending from the opposite side of said base so as to normally substantially close said hook body, said closure tongue being resiliently deformable to open said hook body, said closure tongue having a free end, as said closure tongue is in free form, being disposed inwardly of a free end portion of said hook body with a relatively small gap therebetween; and
    (c) means connecting said eye and hook members for pivotal movements relative to each other, said connecting means including
        (1) a bearing portion molded of synthetic resin as an integral part of said hook member and extending from said hook member, said bearing portion being divided into a pair of opposed bearing halves by a space, said bearing halves having a pair of aligned through-holes of circular cross section communicating with said space, and
        (2) an arm portion molded of synthetic resin as an integral part of said eye member and projecting from an opposite side of said base remotely from said hook body and said closure tongue into said space and terminating in an enlarged end which is loosely received in said through-holes in said bearing halves across said space for rocking movements.

2. A swivel snap hook according to claim 1, said closure tongue being, in its free form, parallel to the general plane of said free end portion of said hook body.

3. A swivel snap hook according to claim 1, said free end of said closure tongue being inwardly bent.

4. A swivel snap hook according to claim 3, said hook body including a substantially straight stem portion projecting perpendicularly from said base, and a hook-shaped portion extending substantially perpendicularly from a lower end of said stem portion and terminating in said free end portion, said hook body having a projection extending inwardly from said stem portion and disposed slightly below said bent free end of said closure tongue so as not to interfere therewith when said closure tongue is inwardly depressed.

5. A swivel snap hook according to claim 4, said projection having a concave under-surface as an extension of an arcuate inner surface of said hook-shaped portion, said hook-shaped portion having on its inner surface a reinforcement rib having a concave surface as an extension of the arcuate inner surface of said hook-shaped portion, said concave under-surface of said projection and said concave surface of said reinforcement rib being a pair of diametrically opposed parts of the circumference of a circle having a radius (r).

6. A swivel snap hook according to claim 5, said bent free end of said closure tongue, as the latter is in free form, being spaced apart from said projection by a distance (L1) substantially equal to said radius (r).

7. A swivel snap hook according to claim 5, said projection having a height (L2) equal to a distance (L3) between an outer surface of said closure tongue and a tip of said bent free end.

8. A swivel snap hook according to claim 5, said reinforcement rib being in the shape of a generally equilateral triangle having an apex in which said last-named concave surface ternimates, said apex being spaced apart from a tip of said projection by a distance (L4) slightly larger than said radius (r).

9. A swivel snap hook of synthetic resin, comprising:
    (a) an eye member;
    (b) a unitary hook member pivotally connected to said eye member, said hook member having a base, a hook body extending from one side of said base, and a closure tongue extending from the opposite side of said base so as to normally substantially close said hook body and being resiliently deformable to open said hook body, said closure tongue having a free end, as said closure tongue is in free form, being disposed inwardly of a free end portion of said hook body with a relatively small gap therebetween, said free end of said closure tongue being inwardly bent;

(c) said hook body including a substantially straight stem portion projecting perpendicularly from said base, and a hook-shaped portion extending substantially perpendicularly from a lower end of said stem portion and terminating in said free end portion, said hook body having a projection extending inwardly from said stem portion and disposed slightly below said bent free end of said closure tongue so as not to interfere therewith when said closure tongue is inwardly depressed; and (d) said projection having a concave under-surface as an extension of an arcuate inner surface of said hook-shaped portion, said hook-shaped portion having on its inner surface a reinforcement rib having a concave surface as an extension of the arcuate inner surface of said hook-shaped portion, said concave under-surface of said projection and said concave surface of said reinforcement rib being a pair of diametrically opposed parts of the circumference of a circle having a radius (r).

10. A swivel snap hook according to claim 9, said bent free end of said closure tongue, as the latter is in free form, being spaced apart from said projection by a distance (L1) substantially equal to said radius (r).

11. A swivel snap hook according to claim 9, said projection having a height (L2) equal to a distance (L3) between an outer surface of said closure tongue and a tip of said bent free end.

12. A swivel snap hook according to claim 9, said reinforcement rib being in the shape of a generally equilateral triangle having an apex in which said last-named concave surface terminates, said apex being spaced apart from a tip of said projection by a distance (L4) slightly larger than said radius (r).

* * * * *